M. J. McGOWAN.
TROLLEY WHEEL BEARING.
APPLICATION FILED MAR. 11, 1918.
1,322,252.
Patented Nov. 18, 1919.
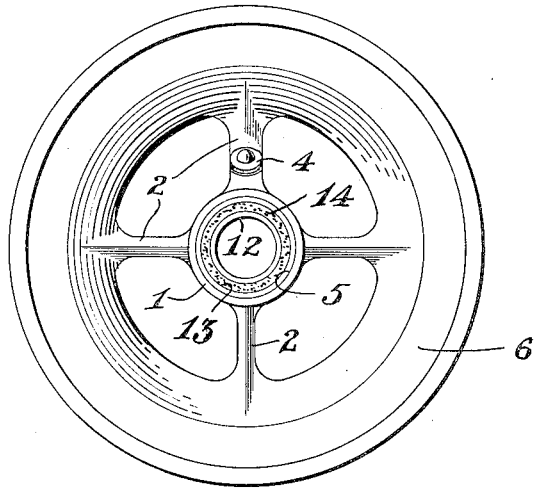
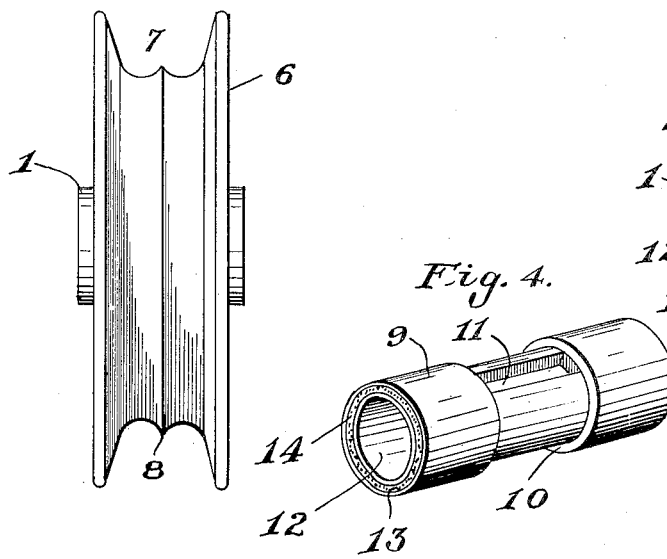
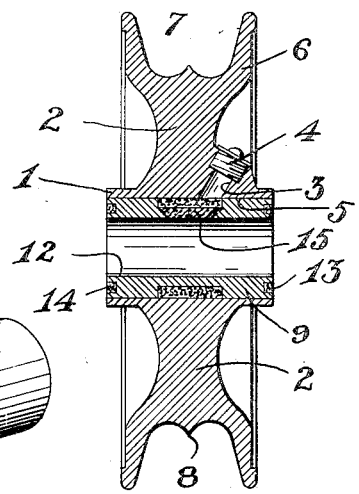
Inventor
M. J. McGowan.
Attorney.

UNITED STATES PATENT OFFICE.

MARTIN J. McGOWAN, OF SCRANTON, PENNSYLVANIA.

TROLLEY-WHEEL BEARING.

1,322,252.   Specification of Letters Patent.   Patented Nov. 18, 1919.

Application filed March 11, 1918. Serial No. 221,829.

*To all whom it may concern:*

Be it known that I, MARTIN J. McGOWAN, a citizen of the United States, residing at Scranton, in the county of Lackawanna and State of Pennsylvania, have invented certain new and useful Improvements in Trolley-Wheel Bearings; and I do hereby declare the following to be a full, clear, and exact description of the invention, such as will enable others skilled in the art to which it appertains to make and use the same.

This invention relates to improvements in trolley wheel bearings and its principal object resides in the provision of a means for retaining a suitable lubricant in the bearing and thus reducing wear on both the bearing and axle of a wheel.

Another object of the invention resides in the provision of a bearing having an oil or lubricant retaining groove extending therearound which is associated with the oil hole in the wheel in such a way that in assembling no care need be exercised to insure the proper positioning of the bearing in the wheel hub.

A further object of the invention is to provide a suitable lubricant distributing medium for contact with the axle for feeding the lubricant to the points of wear.

With the above and other objects in view as will become more apparent as the description proceeds the invention consists in certain novel features of construction, combination and arrangement of parts, as will be fully set forth in the following specification, claimed and illustrated in the accompanying drawing, in which;

Figure 1, is a side elevation of a trolley wheel constructed in accordance with this invention.

Fig. 2, is an edge elevation of the wheel,

Fig. 3, is a vertical sectional view through the wheel, and

Fig. 4, is a perspective view of the bearing.

Referring to the drawing by characters of reference, the numeral 1, designates the hub of a wheel having radiating therefrom the spokes 2, one of which is of greater thickness than the others and is provided with a suitable oil hole 3, which is provided with an oil cup 4 at its outer end. The inner end of the oil hole 3 communicates with the longitudinal bore 5, of the hub, as will be clearly seen upon referring to Fig. 3. The outer ends of the spokes have formed integrally therewith a rim 6 which is formed with a peripheral groove 7, the bottom wall of which is formed centrally with an annular rib 8, which separates the inner portion of the groove into two separate channels.

The bearing bushing of the wheel is best illustrated in Figs. 3 and 4 and consists of a cylinder 9 formed intermediate its ends with an annular groove 10. An elongated slot 11 is formed in the cylinder 9 between the end walls of the groove 10 and communicates with the longitudinal bore 12 of the cylinder. Formed in opposite ends of the cylinder are grooves 13 which are filled with graphite or any other suitable lubricant 14.

A plug of felt or similar fibrous material which will conduct lubricant is designated by the numeral 15 and is inserted in the slot 11, after which a winding of yarn or similar material is placed in the groove 10 so that the plug 15 is completely inclosed. In order that the plug 15 will not be forced through the slot 11, the side and end walls thereof are inclined, as clearly indicated in the drawing.

It will be apparent from the foregoing that in assembling the device the plug 15 is first inserted in the slot 11 and the winding is then placed upon the cylinder 9 within the groove 10. The cylinder is then placed in the bore 5 of the hub and it will be seen that when a lubricant is introduced into the oil hole it will find its way into the groove where it will be absorbed by the winding and fed into the plug 15 which in turn acts as a distributing agent for lubricating the axle.

While in the foregoing there has been shown and described the preferred embodiment of this invention it is to be understood that certain changes in the construction, combination and arrangement of parts may be resorted to without departing from the spirit and scope of the invention as claimed.

What is claimed is:

1. The combination with a wheel comprising a hub, spokes and a rim, of a bearing comprising a cylinder having a groove formed in its periphery intermediate its ends and being provided with a slot between the ends of the groove, a fibrous plug within the slot, a winding of fibrous material in the groove for holding the plug in place and conducting lubricant thereto, and one of the spokes having an oil hole therein for communication with the groove whereby lubricant injected into the oil hole will be fed into the plug in the slot.

2. In a bearing, the combination with a wheel comprising a hub portion, spokes radiating therefrom, a grooved rim at the ends of the spokes, one of said spokes having an oil hole therein, and a plug in the outer end of the oil hole, the inner end of said hole communicating with a longitudinal opening in the hub, of a bearing cylinder having an axial bore extending therethrough, an annular groove in its periphery intermediate its ends and a slot between the end walls of the groove, said slot communicating with the axial bore, a plug within the slot, said plug being of a fibrous material, a winding of fibrous material within the groove for holding the plug in place and conducting lubricant from the oil hole in the spoke to the plug and thereby lubricating the axle of the wheel on which the bearing is used.

In testimony whereof I affix my signature.

MARTIN J. McGOWAN.